July 26, 1960
R. GILMONT
2,946,486
ANALYTICAL DEVICE
Filed May 29, 1957
2 Sheets-Sheet 1
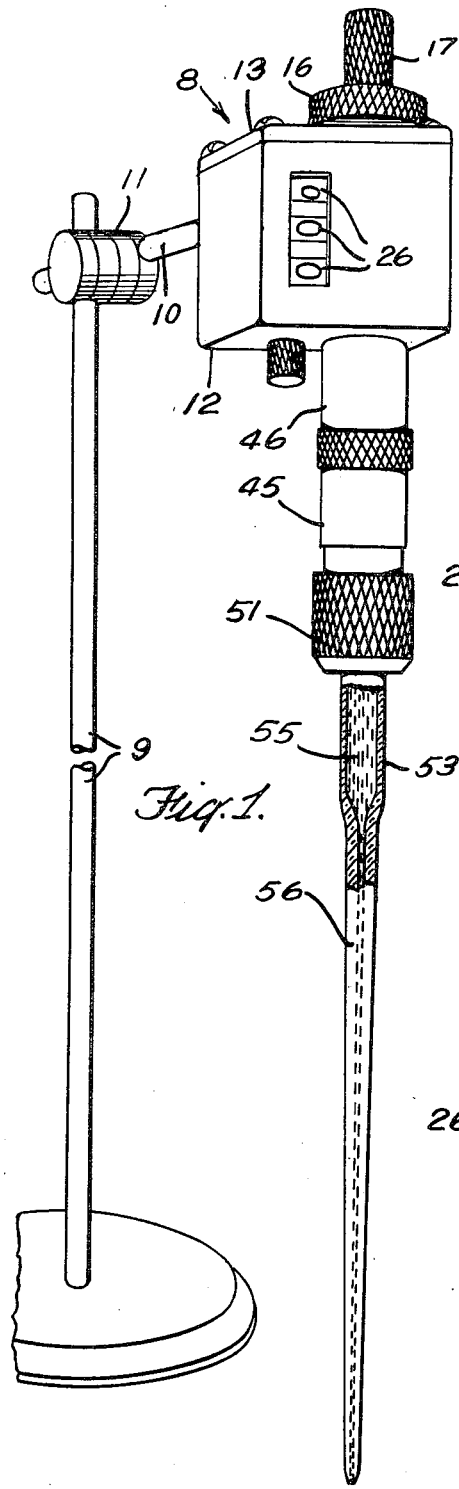
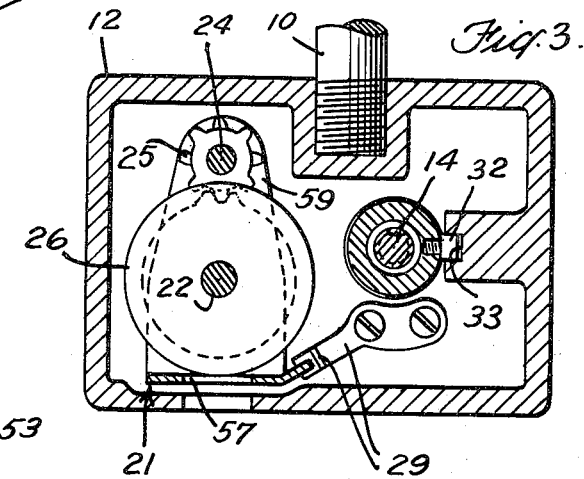
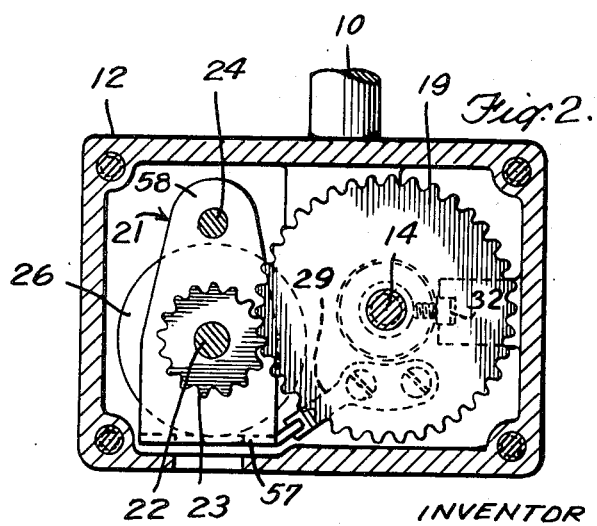
INVENTOR
ROGER GILMONT
BY A. A. Orlinger
ATTORNEY July 26, 1960  R. GILMONT  2,946,486
ANALYTICAL DEVICE
Filed May 29, 1957  2 Sheets-Sheet 2
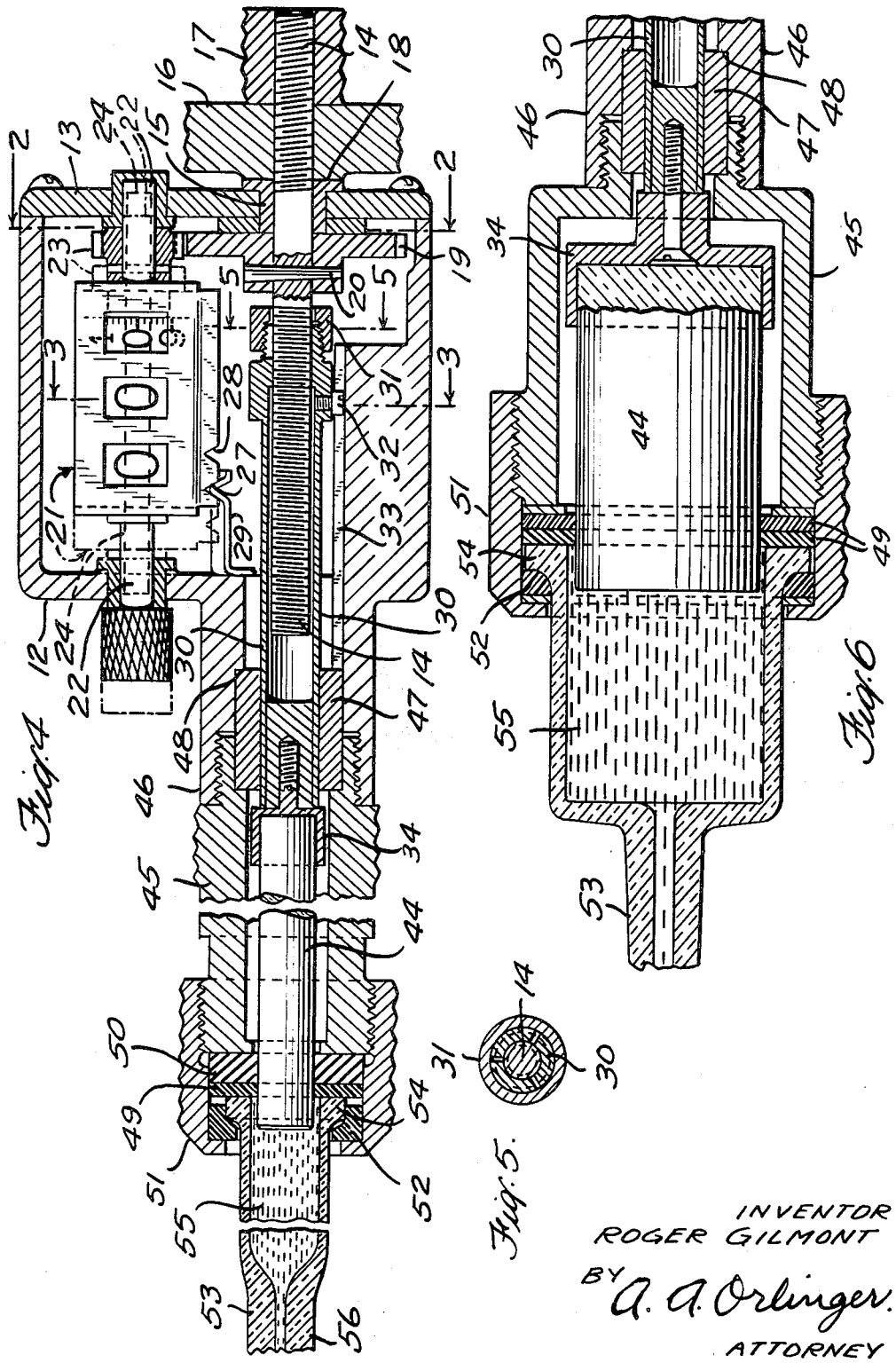
INVENTOR
ROGER GILMONT
BY A. A. Orlinger.
ATTORNEY

# United States Patent Office 2,946,486
Patented July 26, 1960

2,946,486

ANALYTICAL DEVICE

Roger Gilmont, Douglaston, N.Y., assignor to Manostat Corporation, New York, N.Y., a corporation of New York Filed May 29, 1957, Ser. No. 662,527

9 Claims. (Cl. 222—38)

This invention relates to titrating devices and particularly to microburets or micropipets to deliver minute quantities of titrating solution and that have precision indicators for measuring cubic increments of the titrant used.

According to the invention, there is provided a microburet having a mechanical counter indicator in the form of counter wheels which give highly efficient operation with ease and unusual precision of volumetric measurement hitherto unknown in devices of analogous character. The counter wheels are driven by virtue of their operative connection with the driving elements for the titrant propelling plunger of the pipet, means being provided for breaking the connection to enable resetting the counter without disturbing the axial position of the plunger. The translation of the plunger in response to the input rotation required by the counter is achieved by a unique arrangement of precision parts that provide very minute delivery of titrant and include a specially designed mounting rod which causes the conversion from rotation to axial movement and assures that such conversion will occur accurately and without lost motion effects.

Additionally, the structural elements of the microburet are conveniently and simply arranged to facilitate the easy interchange of microburets of different total capacities and to enable such interchange without disturbing the already set calibration of the counter and its operating parts.

One feature of this invention is the provision of a microburet or micropipet having counter measuring indication that gives a direct reading of the used quantity of titrant.

Another object of the invention is to provide a counter type pipet having a precise, volumetric measuring capability and a simplicity and economy of construction which is peculiarly adapted to accommodate burets of different total capacities.

Other objects and advantages of the invention may be appreciated on reading the following detailed description taken in conjunction with the accompanying drawings, in which Fig. 1 is a perspective view of a microburet mounted on its standard with its capillary tube shown partially in cross-section, Fig. 2 is a section taken on line 2—2 of Fig. 4, Fig. 3 is a section taken on the line 3—3 of Fig. 4, Fig. 4 is a longitudinal section showing the operating elements of this device, Fig. 5 is a transverse section taken on line 5—5 of Fig. 4, and Fig. 6 is a fragmentary section showing a special adapting unit for a different size liquid reservoir.

Referring to the drawings, the microburet 8 is adapted to be universally mounted on a standard 9 by virtue of an attached extension member 10 which is threadably received by the universal joint 11 slidably and pivotally supported on the standard 9.

The microburet 8 has a housing 12 which is provided with a removable closure plate 13. The housing 12 contains a screw spindle 14 which extends through a bushing 15 in the closure plate 13 and has mounted thereon a knurled knob 16 set against the bushing on the coarse threads of the protruding end of the spindle 14. A lock nut 17 holds the knob on the spindle with a preselected face to face engagement at 18 between bushing 15 and the knob 16.

Within the housing and mounted on the spindle 14 adjacent the closure plate 13 is gear 19 having a hub through which a tapered pin 20 is extended to affix the gear 19 to the spindle 14.

Also within the housing 12 and disposed above the spindle is a conventional counter 21 which measures in terms of liquid volume the amount of fluid ejected by the device in titration. The counter 21 comprises a slidable counter shaft 22 rotatably supported in bushings carried by the housing and closure plate. A pinion 23 is secured to the shaft 22 and is adapted to engage the gear 19. The counter 21 is provided with a windowed frame 57 which is held against rotation by arms 58 and 59 through which are passed housing supported shaft 24 which carries the transfer wheels 25 for the counter wheels 26 carried by the counter shaft 22.

The bottom of the windowed frame 57 has notches 27 and 28 to receive detent arm 29 attached by screws to the housing 12. The counter 21 may be drawn to the left, as shown by the dotted line position of the counter and shaft 22 so as to disengage the gear 19 from pinion 23. In this position, the notch 28 engages the complementary portion of the detent arm which is sufficiently yieldable to permit the movement. Setting the counter wheel positions on the countershaft at some desired starting point such as zero thus can be carried out without affecting gear 19 and its associated spindle.

The spindle 14 is received in the housing by a hollow mounting rod 30 which is open at one end. The open end portion is enlarged and threaded at its extreme end which is tapered and split to receive an adjusting nut 31. Thereby the screw engagement of the mounting rod and spindle at this end may be effected with precision by having this nut 31 allow a running fit between the spindle and the rod.

The enlarged end of the mounting rod 30 carries a screw 32 received in a tapped hole in that end. The head of the screw 32 is slidably received in slot 33 so as to permit the translation of the mounting rod upon turning the spindle.

The enlarged end of hollow rod 30 has internal threads which engage the external threads on spindle 14 so that, when the spindle is turned clockwise by knob 16, the rod 30 is moved axially with the screw 32 riding in the slot 33 and the plunger 44 moving outwardly to expel solution from capillary tube 53.

The opposite end of the mounting rod 30 is plugged and receives in its tapped hole an anchoring extension member or cup carrier 34, into which is cemented or otherwise fixedly secured a glass plunger 44. Plunger 44 is axially moved within a barrel 45 which is removably attached to an extension 46 of the housing 12. A replaceable sleeve 47 is fitted against a shoulder 48 of the extension of the body and serves slidably to support the mounting rod at its sliding junction with the sleeve.

Thee free end of the plunger 44 extends through a "Teflon" washer 49 and an organic silicone polymer washer 50, which are held in place against the end of the barrel 45 by coupling nut 51, which is threaded on the barrel, and a split "Teflon" adapter ring 52 and the enlarged end of buret capillary tube 53. Sealing pressure is transmitted by the coupling nut 51 and adapter ring 52 to an annular bead 54 on the rim of the capillary tube 53, the end face of which is in sealing engagement with the "Teflon" washer 49.

The capillary tube 53 comprises a buret reservoir 55 at its enlargement communicating with the capillary extension 56 of the tube.

For a given size microburet, the gear ratio of gear 19 and pinion 23 must be correlated with the pitch of the spindle 14 to yield a predictable increment of volumetric displacement. The three number wheels and graduations give a total of 5000 divisions. Thus, for one microliter total capacity buret, each division corresponds to 0.0002 microliter for a 3.125 to 1 gear ratio and a spindle thread pitch of 32 threads per inch. For the given gear ratio and pitch, cubic increment of titrant expelled per counter division may be determined for a buret of any total capacity.

Because of the construction of the microburet, the glass plunger and buret may be replaced by a plunger and buret of different capacity without the necessity of modifying the counter and spindle elements. As shown in Fig. 6, the barrel 45 may be replaced to accommodate plungers and burets of various sizes. The cup carrier 34 is easily changed without further disassembling the device when such replacement is made. The coupling nut, which must be released to make the replacement, also serves on loosening to remove entrapped air which is recommended before setting the counter wheel. The microburet is thus demonstrated to have a high refinement for delivery of minute quantities of titrant and considerable and easy versatility and accompanying ease of manipulation by the operator notwithstanding its relative simplicity and economy of structural parts.

While the invention has been described in detail in relation to the foregoing specific embodiment of it, the glass of plunger 44 can be replaced by some other solid material that can be prepared with accuracy of dimensional cross-section in relation to the minuteness of quantity of titrant to be delivered in relation to the size of the titrant reservoir barrel, and also other modifications and substitutions can be made in the specifically described embodiment without departing from the principle and scope of the invention as defined in the depending claims which are intended to cover also equivalents of the specific embodiment.

What is claimed is:

1. A microburet comprising a discharge buret having capillary tubing at one end and an enlarged chamber or titrant reservoir at the other end, a barrel communicating with said buret and having a translatable plunger axially guided therein and a housing, said housing having a longitudinal slot therein, a slidable, hollow mounting rod connected to said plunger at one end and having an opening at the opposite end, said mounting rod having a depending nut slidably received in said slot whereby said rod is restrained from rotation, a screw spindle in threaded engagement with said mounting rod extending through the open end thereof and through said housing, an indicator including a plurality of indicia-bearing counter wheels, a counter shaft on which said wheels are carried and a pinion secured to said counter shaft, a gear mounted on said screw spindle and adapted to engage said pinion, whereby the ratio of said gear and pinion and the pitch of said screw spindle thread predetermines the calibration of said counter for a given total capacity buret.

2. A microburet comprising a discharge buret having capillary tubing at one end and an enlarged chamber or titrant reservoir at the other end, a barrel communicating with said buret and having a translatable plunger axially guided therein and a housing, said housing having a longitudinal slot therein, a slidable, hollow mounting rod connected to said plunger at one end and having an opening at the opposite end, said mounting rod having a depending nut slidably received in said slot whereby said rod is restrained from rotation, a screw spindle in threaded engagement with said mounting rod extending through the open end thereof and through said housing, the external surface at the open end portion of said mounting rod being threaded and tapered and an adjusting nut being fitted onto said open end, said nut being adapted to be employed to pre-set the desired screw thread engagement of the mounting rod and said screw spindle; an indicator including a plurality of counter wheels, a counter shaft on which said wheels are carried and a pinion secured to said counter shaft, a gear mounted on said screw spindle and adapted to engage said pinion, whereby the ratio of said gear and pinion and the pitch of said screw spindle thread predetermines the calibration of said counter for a given total capacity buret.

3. A microburet as claimed in claim 2, wherein the open end of said mounting rod is split so as to facilitate the presetting of said adjusting nut.

4. A microburet as claimed in claim 3, wherein the connection between said mounting rod and said plunger is a cup carrier comprising a plunger receiving member the dimensions of which are dependent on the size of the plunger and buret and a rod attaching extension member the size of which is independent of the size of said plunger and buret.

5. A microburet as claimed in claim 4, wherein there is provided a coupling nut to connect the buret to the barrel, said coupling nut providing a shoulder, a bead on the rim of said buret engaging the shoulder to provide a seal in the coupling joint of said buret and barrel.

6. A microburet comprising a discharge buret having capillary tubing at one end and an enlarged chamber or titrant reservoir at the other end, a barrel communicating with said buret and having a translatable plunger axially guided therein and a housing, said housing having a longitudinal slot therein, a slidable, hollow mounting rod connected to said plunger at one end and having an opening at the opposite end, said mounting rod having a depending nut slidably received in said slot whereby said rod is restrained from rotation, a screw spindle in threaded engagement with said mounting rod extending through the open end thereof and through said housing, an indicator including a plurality of counter wheels, a counter shaft on which said wheels are carried and a pinion secured to said counter shaft, said counter shaft being axially slidable, whereby the meshing engagement of said pinion and said gear can be made and broken as desired, a gear mounted on said screw spindle and adapted to engage said pinion, whereby the ratio of said gear and pinion and the pitch of said screw spindle thread predetermines the calibration of said counter for a given total capacity buret.

7. A microburet as claimed in claim 6, wherein a yieldable detent arm is attached to the housing for said counter and the counter has a windowed frame provided with notches located so as to insure the engagement or disengagement of the pinion and the gear on sliding said counter shaft.

8. A microburet as claimed in claim 7, wherein there is provided a second shaft supported by the housing for carrying the transfer wheels of the counter indicator, said second shaft being disposed to engage arms extending from, and thereby to support, the windowed frame of the counter, whereby said counter is restrained from rotation on turning said counter shaft.

9. A microburet comprising a discharge buret having capillary tubing at one end and an enlarged chamber or titrant reservoir at the other end; a housing beyond said other end; a barrel communicating with said buret and housing and having a translatable plunger axially guided therein; and means in said housing for guiding said plunger, said means being a slidable member connected to said plunger; an indicator having a plurality of indicia-bearing counter-wheels supported in another part of said housing and with said indicia readable from without it; and driving means operatively connected to said counter-wheels and to said slidable member for correlating the displacement of said slidable member to the turning of the counter-wheels whereby titrant may be expelled from said buret in incrementally measurable quantities and the amount of titrant expelled is indicated by the reading shown by the indicia on the counter-wheels.

References Cited in the file of this patent

UNITED STATES PATENTS

| | | |
|---|---|---|
| 55,433 | Wheeler | June 5, 1866 |
| 231,795 | Harris | Aug. 31, 1880 |
| 958,919 | Haines | May 24, 1910 |
| 2,052,296 | Huntley | Aug. 25, 1936 |
| 2,272,641 | Mureau | Feb. 10, 1942 |
| 2,412,295 | Shaffer | Dec. 10, 1946 |
| 2,729,970 | Faris, et al. | Jan. 10, 1956 |

OTHER REFERENCES

Analytical Chemistry, vol. 20, No. 4, pages 286, 287.